J. E. WITHERS.
NUT-LOCK.

No. 172,815.  Patented Jan. 25, 1876.

WITNESSES.
Frank Pardow
Charles Knutner

INVENTOR.
James E. Withers
by J. G. Hewitt
attorney.

UNITED STATES PATENT OFFICE.

JAMES E. WITHERS, OF LOUISVILLE, KENTUCKY.

IMPROVEMENT IN NUT-LOCKS.

Specification forming part of Letters Patent No. 172,815, dated January 25, 1876; application filed June 24, 1875.

*To all whom it may concern:*

Be it known that I, JAMES E. WITHERS, of the city of Louisville, in the county of Jefferson and State of Kentucky, have invented a certain new and useful Improvement in Nut-Locks for Screw-Bolts; and I do hereby declare that the following is a full, clear, and exact description thereof, which will enable others skilled in the art to make and use the same, reference being had to the accompanying drawings hereto annexed, in which—

Figure 1:
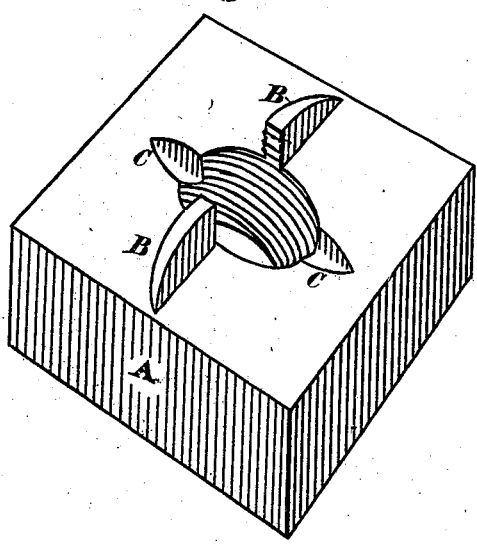
Figure 2:
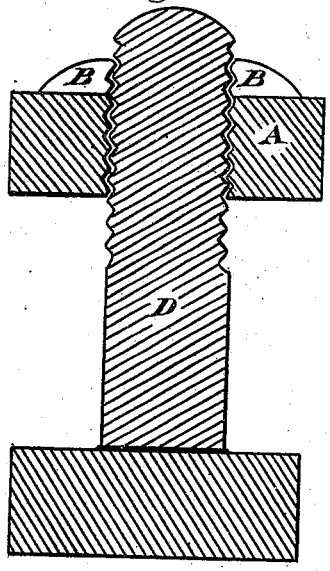

Figure 1 is a perspective view, showing the lugs or projections on the top. Fig. 2 is a sectional view of the nut with a bolt in it, in order to more fully illustrate the invention.

Similar letters of reference indicate corresponding parts of the drawings.

This invention is in the nature of an improvement in nut-lock for use on the bolts of fish-bars of rails, and for other purposes; and the invention consists in a nut provided with lugs projecting from the face thereof, with one edge in line with the threaded eye or opening, so that when said nut is screwed into position the thread of the bolt can be upset or raised behind the lugs, and thereby effectually lock said nut.

A is the nut, the greater part of which is made similar to those now in common use, except that each nut is provided with two or more lugs or projections on the top, extending in against the bolt, so that when a thread is cut in the nut it is also cut in the end of the lugs next to the bolt; and, in order to lock it, it is only necessary to take a small chisel and raise the thread of the bolt behind the lugs, which will effectually hold it in position without materially injuring the bolt, the thread of which will be again replaced by the thread in the lugs when forced over it in taking it off again, which is easily done by means of an ordinary screw-wrench for that purpose.

B B are these lugs or lock-projections, all of which are made in form as shown in the drawing; but, instead of using these lugs, as described, notches may be cut in the edge of the opening, as shown at C C in the drawing, and the shoulders formed thereby used as a substitute for the raised lugs, or may be used in connection with them, when required.

C C are the notches in the opening of the nut, and D is the bolt.

Having thus fully described the nature and object of this my invention, what I claim as new, and desire to secure by Letters Patent, is—

The nut A, as above described, provided with lugs B on its face, substantially as and for the purpose set forth.

JAMES E. WITHERS.

Witnesses:
  CHARLES SWETNER,
  FRANK PARDON.